United States Patent [19]

Levine et al.

[11] Patent Number: 5,225,869
[45] Date of Patent: Jul. 6, 1993

[54] FILM PRINTER

[75] Inventors: Mark Levine, Westminster; Ralph Schroeder, Arcadia, both of Calif.

[73] Assignee: Hollywood Film Corp., Los Angeles, Calif.

[21] Appl. No.: 793,794

[22] Filed: Nov. 18, 1991

[51] Int. Cl.[5] .............................................. G03B 27/08
[52] U.S. Cl. .................................... 355/105; 355/104
[58] Field of Search .................. 355/104, 105, 90; 352/225

[56] References Cited

U.S. PATENT DOCUMENTS

| 3,533,695 | 10/1970 | Jeffee et al. | 355/105 |
| 3,582,207 | 6/1971 | Johnson et al. | 355/104 |
| 3,914,035 | 10/1975 | Satterfield | 352/225 |
| 4,076,418 | 2/1978 | O'Brien | 355/104 |

Primary Examiner—Monroe H. Hayes
Attorney, Agent, or Firm—Erik M. Arnhem

[57] ABSTRACT

A movie film printer having a film lift-off device for performing a splicing and cutting operation without physically altering the film negative. A film positive can be temporarily withdrawn from a drive sprocket so that the sprocket can advance the film negative to a new setting where a scene can be extracted for printing on the film positive.

7 Claims, 2 Drawing Sheets

FILM PRINTER

BACKGROUND AND SUMMARY OF THE INVENTION

This invention relates to a film printer, i.e. an apparatus having a light source for directing light through a printing aperture onto an advancing film negative and synchronously moving film positive (rawstock), whereby images on the film negative are printed onto the film positive. The apparatus has utility for printing movie film.

Conventional movie film printing practice involves extracting scenes from film negatives by a cutting and splicing operation. Often multiple negatives must be generated to produce a suitable master negative for printing purposes.

The present invention concerns a film printer that can function satisfactorily without the cutting and splicing that is ordinarily required. In one form of the invention the printer is a continuous contact rotary printer that includes a hollow cylindrical printing head having a printing aperture on the cylinder surface. A rotary drive sprocket is coaxial with the printing head for synchronously moving a film negative and film positive (rawstock) transversely across the printing aperture, whereby the application of light through the printing aperture causes images on the film negative to be printed on the undeveloped film (rawstock).

A cyclically operated film lifting device is located in near proximity to the printing head for intermittently pulling the film positive away from the printing aperture and out of driven connection with the drive sprocket. While the undeveloped film positive is disconnected from the drive sprocket, the sprocket can be operated to advance the film negative across the printing aperture; at this time the film positive remains motionless in a standby condition. When the film negative is advanced to a desired distance the sprocket is stopped, and the lifting device is moved in a reverse direction to shift the film positive back into facial contact with the film negative at the printing aperture. The drive sprocket can then be operated to synchronously move the film negative and film positive across the printing aperture, thereby printing the film positive The cyclically operated film lifting device can effectively achieve a "cut and splice" function without physically cutting or altering the film negative. The film printing process is thereby quickened and simplified.

THE DRAWINGS

DESCRIPTION OF A PREFERRED EMBODIMENT OF THE INVENTION

Figure 1:
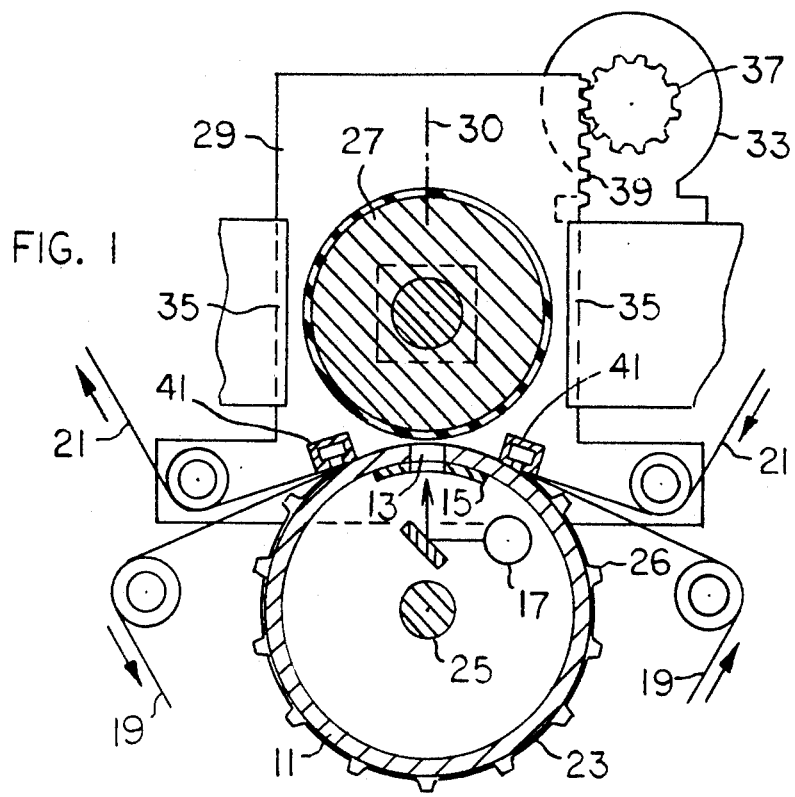
FIG. 1 is a fragmentary schematic illustration of a film printer embodying the invention.

The drawings show a movie film printer that includes a stationary hollow cylindrical printing head 11 having a printing aperture 13. A movable shutter 15 is arranged for movement across the aperture to control the intensity of the light generated at light source 17. The shutter can also be operated to completely block the flow of light through aperture 13.

In the drawings numeral 19 designate a film negative arranged for movement across printing aperture 13; numeral 21 designates an undeveloped film positive arranged to facially engage film 19, whereby both films can then be transported over aperture 13 for purposes of transferring the images on film 19 onto the film positive. A rotary drive sprocket means 23 is coaxial with the cylindrical printing head for moving the two films 19 and 21 in synchronism over aperture 13.

The direction of film motion is generally right-to-left in FIG. 1; sprocket 23 is powered counterclockwise by a motor, not shown. The motor is preferably reversible so that sprocket 23 can be reversed if necessary. Regularly spaced openings along opposite edge areas of films 19 and 21 register with the teeth 26 of the drive sprocket, whereby sprocket rotation normally advances both films across aperture 13 (when the apparatus is in the condition depicted in FIG. 1). Sprocket teeth 26 are of sufficient length to simultaneously extend through aligned edge openings in both films.

Figure 2:
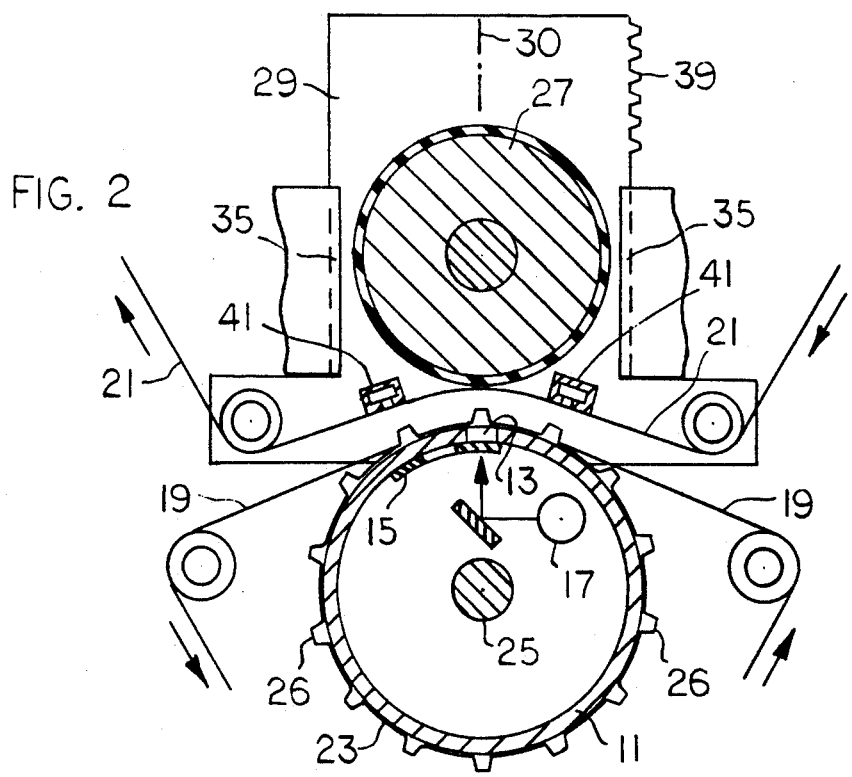
FIG. 2 is a view taken in the same direction as FIG. 1, but showing the printer in a different position of adjustment.

FIG. 2 shows the apparatus in a second operating condition wherein the film positive 21 is lifted away from facial contact with film negative 19. In the FIG. 2 condition sprocket rotation serves to advance film 19 over aperture 13 without any corresponding motion of film 21; film 21 is in a motionless "standby" condition awaiting the arrival of a particular frame of film 19 at aperture 13. While the apparatus is in the FIG. 2 condition there can be movement of film 19, but no image printing on film 21; shutter 15 can be closed or light source 17 can be extinguished during this time.

Sprocket 23 can be a conventional construction having one sprocket, wheel or two axially spaced sprocket wheels attached to a drive shaft 25. The sprocket mechanism moves the films across aperture 13 without obstructing the aperture. The films are normally held down against printing head 11 by a rubber-covered idler roller 27 mounted on a carrier 29. The carrier is slidably mounted in suitable fixed guides 35, whereby the carrier can move along pathline 30 between the two positions depicted in FIGS. 1 and 2.

Any suitable means can be used to power carrier 29 along pathline 30. As shown in FIG. 1, the power means is an electric motor 33 and pinion gear 37; the pinion gear is in mesh with a toothed rack 39 formed or mounted on carrier 29.

Carrier 29 is moved only when drive sprocket 23 is in a motionless condition, and film 19 has the appropriate frame centered relative to aperture 13. Under such conditions, the film positive 21 can be moved into and out of synchronism with film 19 without misaligning the frame edge openings of films 19 and 21.

The drive system for sprocket 23 is an intermittent or stepping system wherein the sprocket cyclically advances the film to a frame-centered position (relative to aperture 13) and then temporarily stops during a printing operation. It is not difficult to locate and retain film 21 in a frame-centered position while film 19 is being moved by sprocket(s) 23 in search of the next scene to be spliced into the picture. While film 19 alone is being moved (forward or backward) film 21 is held motionless in a lifted-off condition by a retaining mechanism. In the FIG. 1 apparatus the retaining mechanism comprises two vacuum-operated clamp devices 41.

Two film clamp devices 41 are mounted on carrier 29 alongside roller 27. Each clamp device can be a vacuum head connectable to a vacuum source, not shown. One or more ports in each vacuum device apply the vacuum force to film 21, whereby the film is then prevented from movement relative to carrier 29. The operating cycle is such that during normal film printing operations each clamp device 41 is disconnected from the vacuum source during scene carrier 29 away drum 11 while each clamp device is connected to the vacuum source so that when the carrier is in the FIG. 2 condition film 21 is held in a motionless condition by clamp devices 41. After the carrier is returned to the FIG. 1 condition clamp devices 41 are disconnected from the vacuum source for resumption of normal film printing. Film retainer devices 41 are located equidistant from a radial line 30 taken through printing aperture 13 and the axis of sprocket 23. The rightmost retainer device is upstream from radial line 30, whereas the leftmost device is downstream from radial line 30. The two retainer devices cooperatively hold film 21 in a motionless condition when the apparatus is in the FIG. 2 condition.

The illustrated lift-off system enables sprocket 23 to move film 19 forward or backward without any corresponding motion of film 21. This action enables the printer to extract selected scenes from film 19 for printing on film 21. The action is a cutting and splicing operation, but without any physical cutting or alteration of film 19.

As previously noted, carrier 29 is only moved (up or down) when film 19 has a frame thereof centered relative to aperture 13. If film 19 is not centered at the time of film 21 lift-off or film 21 return motion, then the two films will not have the desired pictorial synchronism. Various systems can be used to obtain the desired frame centering action for film 19. Such a system can include an optical encoder for sensing the position of the film sprocket holes or the separation lines between frames. Frame location data provided by the encoder can be fed to a microprocessor that controls the sprocket 23 drive motor, so that film 21 lift-off and film 21 return motion take place only when film 19 is in a frame-centered state.

In preferred practice of the invention an industrial computer can be employed to control the various described functions, as well as various normal printing requirements, such as printing lamp control, printing voltage display, electronic servo light valve control and safety line monitoring. The computer can be operated by punched paper tape, floppy disk, or serial connection to a remote central storage device. Software can be loaded via a floppy disk to vary the operation of the mechanism as field conditions might warrant.

Figure 3:
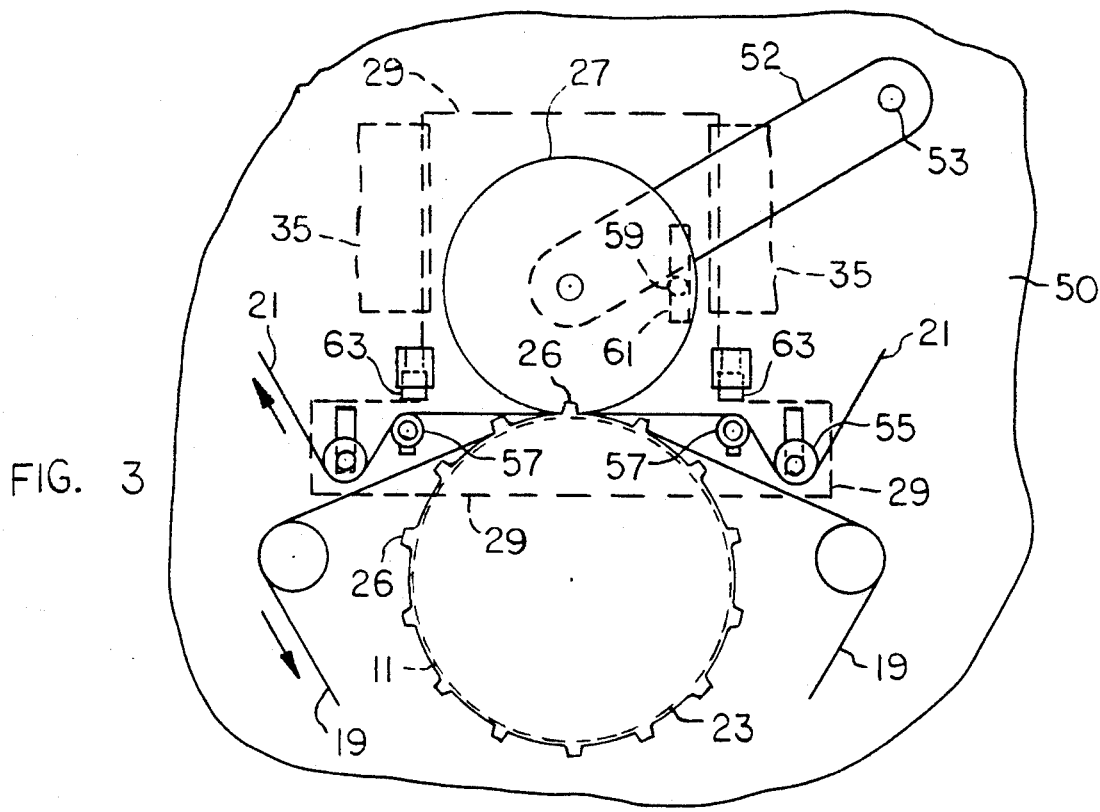
FIG. 3 is a view taken in the same direction as FIG. 1, but illustrating another embodiment of the invention.

FIG. 3 shows another film lift off mechanism embodying the invention. In this case carrier 29 is located behind a stationary wall 50 that serves to rotatably support the drive sprocket 23. The drive motor means for the sprocket is located behind wall 50.

A film hold down roller 27 is carried on a swingable arm 52 that is rotatably supported on wall 50 via a pivot shaft 53. The guide rollers 55 and 57 for the undeveloped film (rawstock) 21 are located in front of wall 50 with their support shafts extending from carrier 29 through vertical clearance slots in wall 50. During normal film printing operations film 19 and film 21 are advanced leftwardly over printing drum 11 via rotary sprocket 23.

When it is desired to temporarily halt the leftward advance of film 21 carrier 29 is powered upwardly, such that film 21 is separated from sprocket teeth 26. A pin 59 extends from carrier 29 through a vertical slot 61 in wall 50; upward motion of the carrier causes pin 59 to lift arm 52, thereby moving roller 27 away from drum 11 Pads 63 are resiliently mounted on wall 50 in the upward path of rollers 57, such that pads 63 forcibly grip film 21 while it is in a position lifted away from drum 11. Pads 63 serve the same function as clamp devices 41 in the apparatus of FIGS. 1 and 2. In an alternate arrangement the rawstock may engage two fixed registration pins when the rawstock is moved upward away from sprocket 23.

Figure 4:
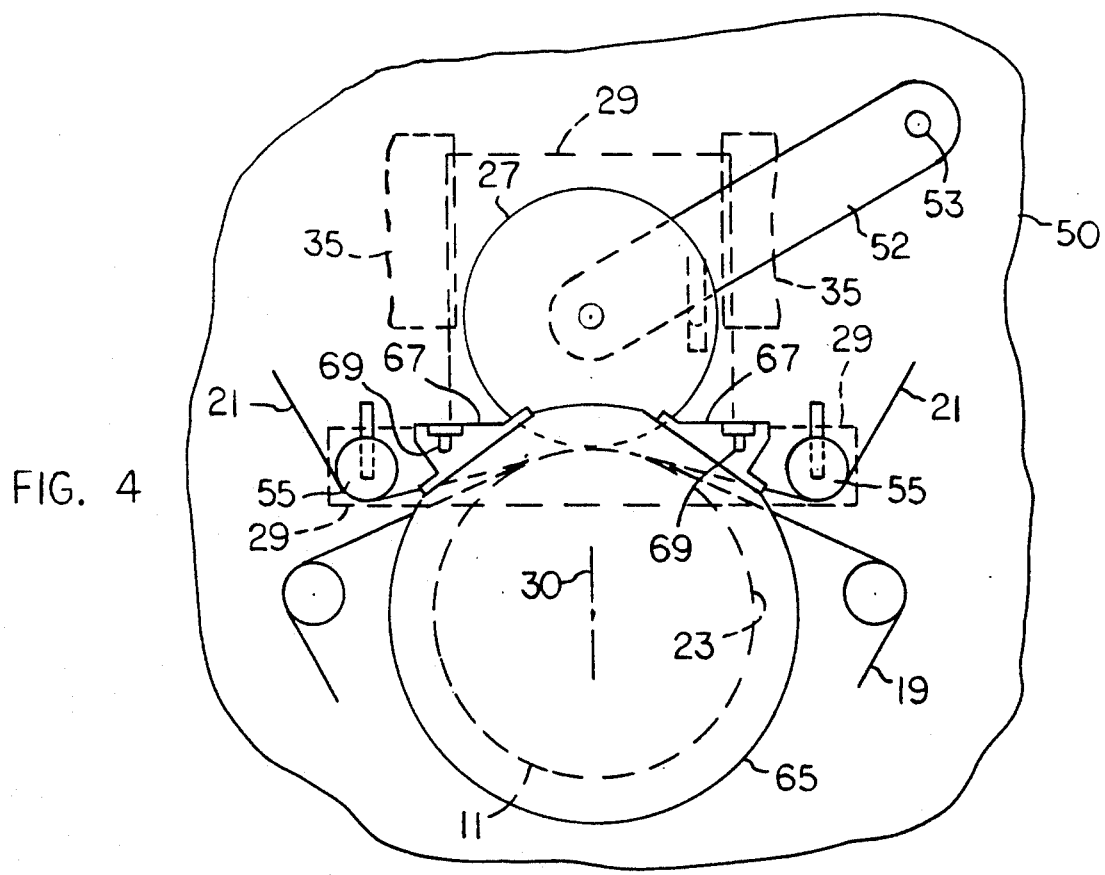
FIG. 4 is a fragmentary view of a another apparatus having a pin registration means useful in practice of the invention.

FIG. 4 schematically shows an alternative pin-type mechanism for preventing movement of film 21 while it is in the lifted-off condition. In this case the mechanism comprises two registration pins 69 positioned to extend into the film sprocket holes. The registration pins are preferably located near the undersurface of roller 27 equidistant from radial line 30 passing through the printing aperture and the sprocket axis.

The FIG. 4 apparatus comprises a fixed housing 65 carried by wall 50 for enclosing the printing head 11 and sprocket 23. Two brackets 67 are bolted onto flats machined in housing 65; each bracket serves as a cantilever mounting for a registration pin 69.

Upward motion of carrier 29 (behind wall 50) raises guide rollers 55; the tensioned film 21 follows the guide rollers, such that the sprocket holes in film 21 move onto fixed pins 69. Pins 69 act as retainer devices to hold film 21 against undesired lateral dislocation while the film is in a lifted condition.

The FIG. 4 apparatus functions in a generally similar fashion to the apparatus shown in FIG. 3, the essential difference being that in FIG. 3 the film retainer means comprises two gripper pads 63, whereas in FIG. 4 the film retainer means comprises two sprocket hole engagement pins 69.

The drawings illustrate three forms that the film lift-off mechanism can take. However, it will be appreciated that the invention ca take various different forms.

What is claimed is:

1. A continuous contact rotary film printer for motion picture film, wherein each film has perforations thereon for moving the film through the printer, said printer comprising: a stationary printing head having a printing aperture; a rotary drive sprocket having a rotational axis aligned with the printing aperture, said sprocket having teeth arranged to engage the perforations in a film negative for moving the film negative transversely across the printing aperture; means for feeding an undeveloped film positive onto the drive sprocket and one face of the film negative, whereby the drive sprocket teeth project through perforations in the film positive to move both films across the printing aperture in synchronous fashion; and means for temporarily lifting the undeveloped film away form the drive sprocket and later returning the undeveloped film to its original position on the sprocket, whereby while the undeveloped film is in its lifted position the drive sprocket is enabled to move the film negative in either direction across the printing aperture without a corresponding movement of the undeveloped film positive.

2. The film printer of claim 1, wherein said film lifting means comprises a carrier (29) movable linearly along a path extending through the printing aperture and sprocket rotational axis.

3. The film printer of claim 1, and further comprising a rotary film hold-down roller (27) engageable with the film positive at a point aligned with the printing aperture; said hold-down roller being mechanically interconnected with said carrier for movement away form the printing aperture during the film lifting operation.

4. The film printer of claim 1, and further comprising two stationary film registration pins (69) located equidistant from the printing aperture in spaced relation to the printing head; said registration pins being located in the path of the film positive during the lifting operation so that perforations in the film positive fit onto said pins, whereby the film positive is held in a motionless condition while it is in its lifted position.

5. The film printer of claim 1, and further comprising means for centering the film negative frame relative to the printing aperture when said film lifting means is actuated to lift the film positive.

6. The film printer of claim 1, wherein said printing head is a stationary cylindrical printing head having a central axis coincident with the rotational axis of said drive sprocket.

7. The film printer of claim 20, wherein said film lifting means comprises a carrier (28) movable vertically only during the lift-off function causing the undeveloped film to move off the printing sprockets on to the fixed pins above.

* * * * *